United States Patent
Ohara

(10) Patent No.: US 9,219,846 B2
(45) Date of Patent: Dec. 22, 2015

(54) INFORMATION PROCESSING SYSTEM HAVING IMPROVED AUTHENTICATION FOR DATA OUTPUT REQUEST, INFORMATION PROCESSING APPARATUS, METHOD OF PROCESSING INFORMATION, AND PROGRAM

(71) Applicant: Kazuki Ohara, Kanagawa (JP)

(72) Inventor: Kazuki Ohara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/499,359

(22) Filed: Sep. 29, 2014

(65) Prior Publication Data
US 2015/0092223 A1    Apr. 2, 2015

(30) Foreign Application Priority Data
Sep. 30, 2013 (JP) .................. 2013-203213

(51) Int. Cl.
*G06K 15/00* (2006.01)
*H04N 1/44* (2006.01)
*G06Q 30/04* (2012.01)
*G06F 3/12* (2006.01)
*G06F 21/60* (2013.01)
*G06F 21/31* (2013.01)

(52) U.S. Cl.
CPC .......... *H04N 1/4433* (2013.01); *G06K 15/4095* (2013.01); *G06Q 30/04* (2013.01); *G06F 3/1222* (2013.01); *G06F 3/1238* (2013.01); *G06F 21/31* (2013.01); *G06F 21/608* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| 2006/0132842 | A1  | 6/2006 | Nakamura |           |
|--------------|-----|--------|----------|-----------|
| 2007/0013938 | A1* | 1/2007 | Itagaki  | 358/1.14  |
| 2009/0033992 | A1* | 2/2009 | Ogiwara et al. | 358/1.15 |
| 2011/0235097 | A1* | 9/2011 | Iwasawa  | 358/1.15  |
| 2013/0044345 | A1* | 2/2013 | Sakai    | 358/1.14  |

FOREIGN PATENT DOCUMENTS

JP    2006-168347    6/2006

* cited by examiner

Primary Examiner — Miya J Cato
(74) Attorney, Agent, or Firm — IPUSA, PLLC

(57) ABSTRACT

An information processing system including at least one information processing apparatus includes a first memory unit that stores information indicative of a necessity of an authentication to a print request with respect to each candidate of a transmission source of the print request; a receipt unit that receives the print request through a network; and a control unit that authorizes a print for the received print request, of which authentication information is received, in a case where the authentication is successful based on the authentication information, and authorizes the print for the received print request, of which authentication information is not received, in a case where the authentication is determined by the transmission source of the print request to be unnecessary based on the information stored by the first memory unit.

9 Claims, 6 Drawing Sheets

FIG.5

| TRANSMISSION SOURCE | NECESSITY OF ORDINARY AUTHENTICATION | AUTHORIZATION OF ALIAS AUTHENTICATION |
|---|---|---|
| 192.168.0.1 | NECESSARY | AUTHORIZE |
| 192.168.0.2 | NECESSARY | UNAUTHORIZE |
| 192.168.0.3 | UNNECESSARY | AUTHORIZE |

| ALIAS | IP ADDRESS | USER NAME | PASSWORD |
|---|---|---|---|
| hostsystem1 | 192.168.0.1 | AAA | **** |
| .. | .. | .. | .. |

22

INFORMATION PROCESSING SYSTEM HAVING IMPROVED AUTHENTICATION FOR DATA OUTPUT REQUEST, INFORMATION PROCESSING APPARATUS, METHOD OF PROCESSING INFORMATION, AND PROGRAM

BACKGROUND OF THE INVENTION

1. Field of the Invention

The present invention relates to an information processing system, an information processing apparatus, a method of processing information, and a program.

2. Description of the Related Art

When an image forming apparatus performs print, printing papers, toner, or the like is consumed. In order to distinguish billing destinations of the consumption, the user information may be included in print data. The image forming apparatus authenticates user information included in the print data. In a case where the user information is authenticated, the print data are printed. When the user information is authenticated, a user of a print request source of the print data is specified and the specified user is determined as the billing destination.

However, it is not always necessary to specify the users of the print request sources of all the print requests. For example, because a billing management of the print data from a specific computer system is exactly performed, it is necessary to specify the user of the print request source. However, there may be a case where it is unnecessary to specify the user of the print source request when the billing management of the print data from the other computer systems and user terminals is not exact.

As described, in a case where multiple computer systems having different requirements for specifying the user of the print request source, it is possible to allocate an individual image forming apparatus to each of the computer systems. As to the computer system requiring to specify the user, it is possible to consider an allocation of an image forming apparatus provided to perform the authentication of the user information included in the print data. As to the computer system not requiring to specify the user, it is possible to consider an allocation of an image forming apparatus provided to print without performing the authentication of the user information.

However, it is not economic to individually install the image forming apparatus.

Patent Document 1: Japanese Laid-Open Patent Publication No. 2006-168347

SUMMARY OF THE INVENTION

It is an object of an embodiment of the present invention to improve flexibility of an authentication process related to an output request of data.

One aspect of the embodiments of the present invention may be to provide an information processing system that includes at least one information processing apparatus including a first memory unit that stores information indicative of a necessity of an authentication to a print request with respect to each candidate of a transmission source of the print request; a receipt unit that receives the print request through a network; and a control unit that authorizes a print for the received print request, of which authentication information is received, in a case where the authentication is successful based on the authentication information, and authorizes the print for the received print request, of which authentication information is not received, in a case where the authentication is determined by the transmission source of the print request to be unnecessary based on the information stored by the first memory unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 5 illustrates an exemplary structure of an authentication necessity memory unit;

FIG. 6 illustrates a structural example of an alias memory unit; and

DETAILED DESCRIPTION OF THE PREFERRED EMBODIMENTS

A description is given below, with reference to the FIG. 1 through FIG. 7 of embodiments of the present invention. Where the same reference symbols are attached to the same parts, repeated description of the parts is omitted.

Reference symbols typically designate as follows:
1: print system;
10: image forming apparatus;
11: controller;
12: scanner;
13: printer;
14: modem;
15: operation panel;
16: network interface;
17: SD card slot;
20: authentication apparatus;
21: authentication unit;
22: alias memory unit;
30: user management apparatus;
31: user information memory unit;
40: user terminal;
50: business system;
80: SD card;
111: CPU;
112: RAM;
113: ROM;
114: HDD;
115: NVRAM;
121: authentication necessity setup unit;
122: print controlling unit;
123: authentication controlling unit; and
124: authentication necessity memory unit.

Figure 1:
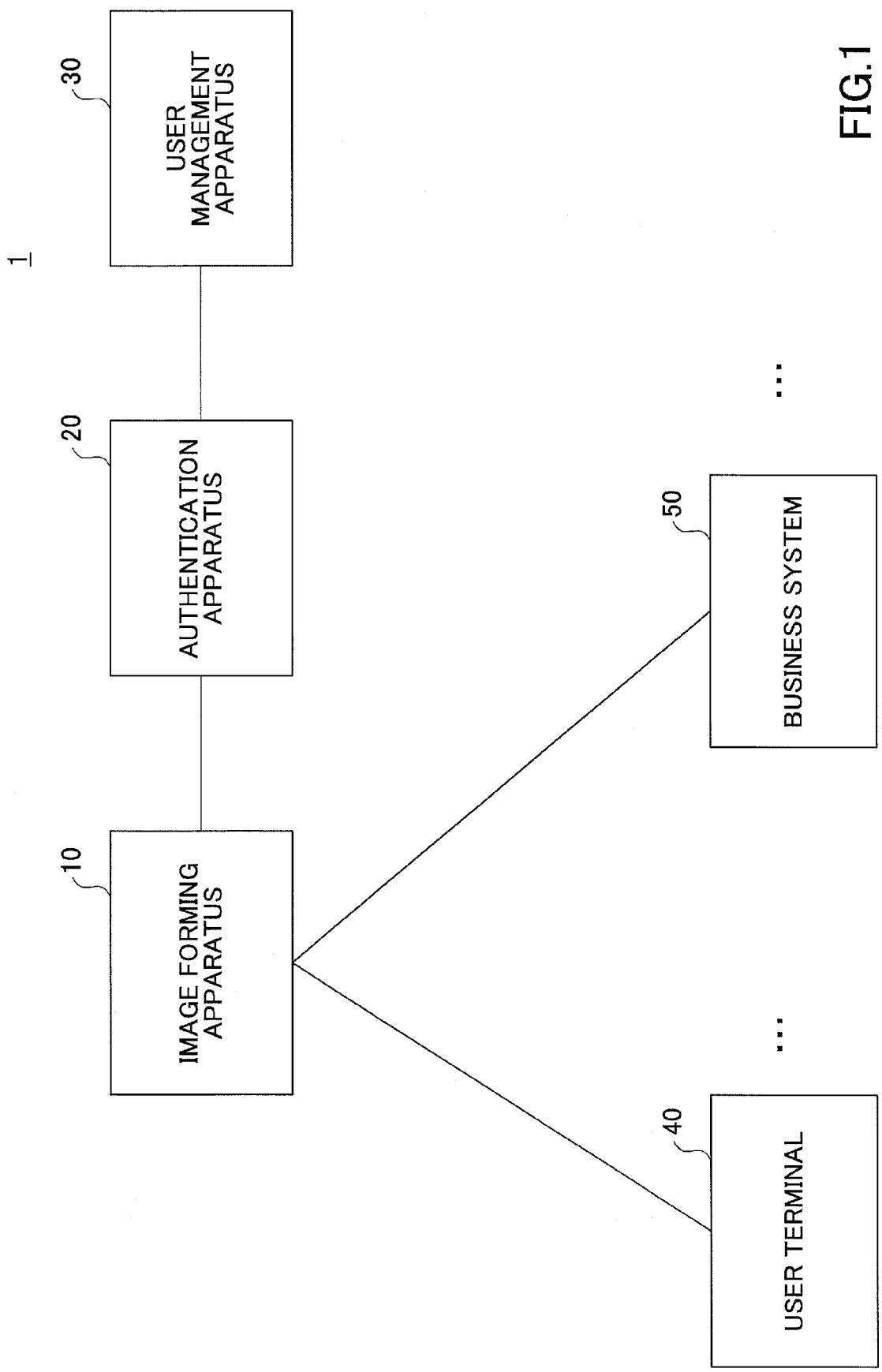
FIG. 1 illustrates an exemplary structure of a print system according to an embodiment of the present invention.

FIG. 1 illustrates an exemplary structure of a print system of the embodiment of the present invention. In a print system 1 illustrated in FIG. 1, an image forming apparatus 10 is connected to at least one user terminal 40, at least one business system 50, and an authentication apparatus 20 through a network so as to be communicable with one another. Further, the authentication apparatus 20 and a user management apparatus 30 are connected so as to be communicable with each other through a network. FIG. 1 illustrates a logical connection. A physical connection is not limited to a mode illustrated in FIG. 1. For example, the image forming apparatus 10, the at least one user terminal 40, the at least one business system 50, the authentication apparatus 20, and the user management apparatus 30 may be connected to a commonly used local area network (LAN) or the like.

The image forming apparatus 10 is, for example, a multi-function peripheral or a printer. Within the embodiment, the image forming apparatus 10 has at least a print function. The image forming apparatus 10 performs print in response to a print request sent from the user terminal 40 or the business system 50.

The user terminal 40 is, for example, a personal computer (PC), a tablet-type terminal, a smart phone, a mobile phone or the like, which is used by an individual user. The user terminal 40 sends a print request to the image forming apparatus 10 in response to an instruction input by the user.

The business system 50 is a computer system specialized to a specific business such as an account system, a medical system, or the like. For example, the business system 50 automatically generates the print data and sends the print request including the print data to the image forming apparatus 10.

The user management apparatus 30 manages (stores) information (hereinafter, "user information") related to the users of the print system 1. For example, the user management apparatus 30 stores the user name, the password and so on for each user. For example, the user management apparatus 30 may be a Lightweight Directory Access Protocol (LDAP) server or a directory service called Active Directory ("Active Directory" is a registered trademark).

The authentication apparatus 20 performs an authentication process using the user management apparatus 30 in response to an authentication request received from the image forming apparatus 10. For example, the image forming apparatus 10 sends the authentication request for the print request received from the user terminal 40 or the business system 50 to the authentication apparatus 20. Within the embodiment, the authentication apparatus 20 provides two authentication methods of ordinary authentication and alias authentication.

The ordinary authentication is an authentication method where authentication information designated by the authentication request from the image forming apparatus 10 and the user information stored in the user management apparatus 30 are directly compared or checked up. Said differently, the authentication information designated by the authentication request of the ordinary authentication includes the user name, the password, and so on stored in the user management apparatus 30.

The alias authentication is an authentication method where an alias can be designated as the authentication information designated to the authentication request received from the image forming apparatus 10. Here, the alias is the user name defined without relation to the user information stored in the user management apparatus 30. The authentication apparatus 20 manages a correspondence between each alias and the corresponding user information stored in the user management apparatus 30. The authentication apparatus 20 specifies the user information from the alias based on the correspondence and performs the authentication using the user information.

An exemplary effect of the alias authentication is such that a user name used by the business system 50 can be set without relation to the user name stored in the user management apparatus 30. For example, the business system 50 has an authentication function in addition to the authentication function of the print system 1, and the user name is managed by the authentication function. As a result, an effective user name is designated in each business system 50 in response to the print request from the business system 50.

On the other hand, in response to the print request from the business system 50, the system structure becomes simpler when the authentication is performed using the user information that is stored in the user management apparatus 30 than when the authentication is requested by the image forming apparatus 10 to each business system 50. Provisionally, in a case where the authentication is requested by the image forming apparatus 10 to each business system 50, the image forming apparatus 10 needs to request the authentication in conformity with procedures mutually different for each business system 50. Further, there may be a case where the business systems 50 does not open an interface for receiving the authentication request from the outside (i.e., the image forming apparatus 10).

Therefore, the user name effective in each business system 50 is set to be the alias corresponding to any of the user information stored in the user management apparatus 30 so that the authentication of the effective user name in each business system 50 is performed using the user management apparatus 30. The user information corresponding to the alias may not be the existing user information. New user information may be defined in conformity with the alias.

Figure 2:
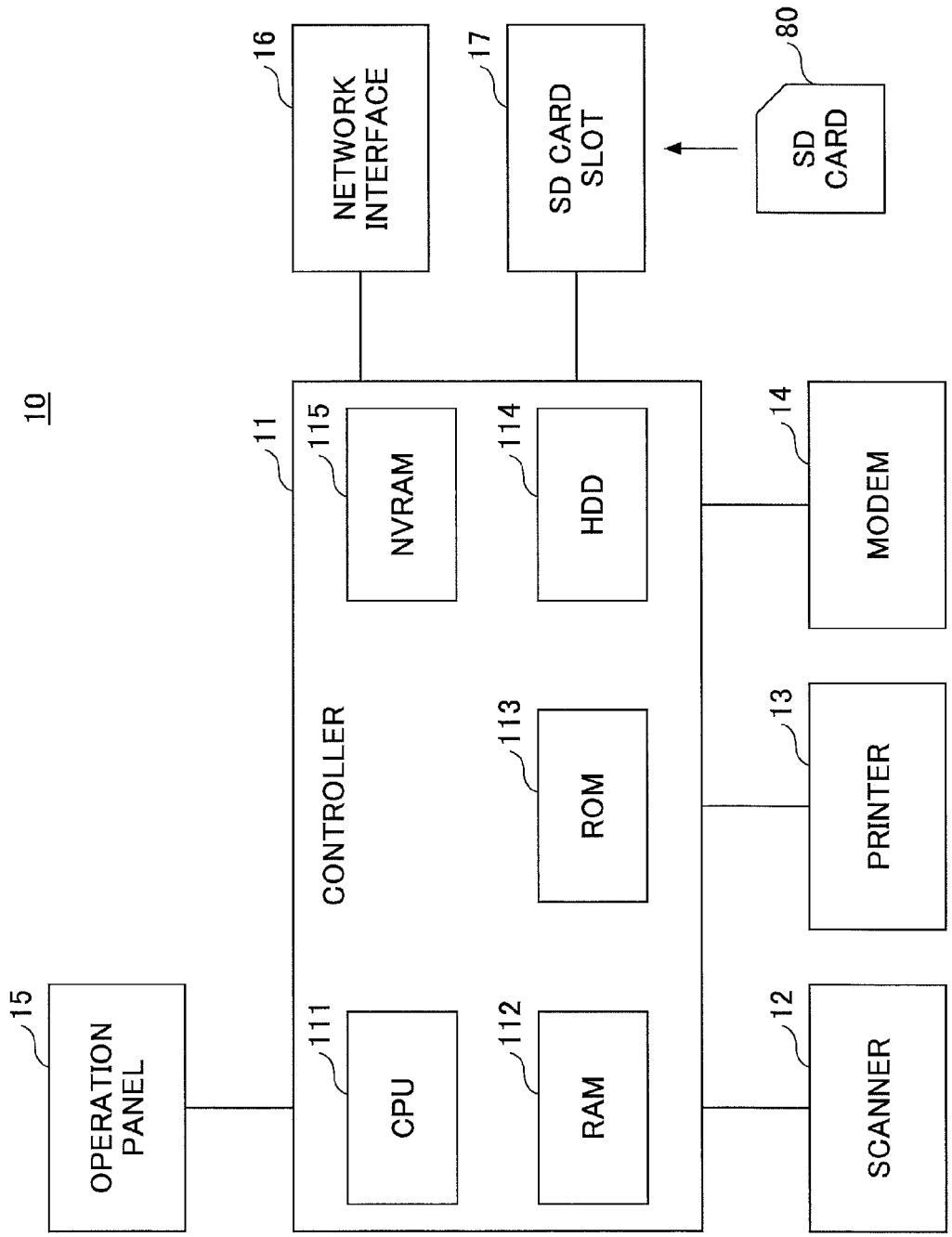
FIG. 2 illustrates an exemplary hardware structure of an image forming apparatus of the embodiment of the present invention.

FIG. 2 illustrates an exemplary hardware structure of the image forming apparatus of the embodiment. Referring to FIG. 2, the image forming apparatus 10 includes hardware such as a controller 11, a scanner 12, a printer 13, a modem 14, an operation panel 15, a network interface 16, and an SD card slot 17.

The controller 11 includes a CPU 111, a RAM 112, a ROM 113, an HDD 114, an NVRAM 115, and so on. Various programs and data used by the programs are stored in the ROM 113. The RAM 112 is used as a memory area for loading the programs, a work area for the loaded programs, or the like. The CPU 111 performs various functions by processing the program loaded into the RAM 112. The HDD 114 stores programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the image forming apparatus 10 to a telecommunication line and is used for sending and receiving the image data with fax communications. The operation panel 15 is hardware provided with an input unit for receiving an input from the user such as a button, a display unit such as a liquid crystal panel, or the like. The liquid crystal panel may have a touch panel function. In this case, the liquid crystal panel may also have the function of the input unit. The network interface 16 is hardware for connecting the image forming apparatus 10 to a wired or wireless network such as LAN. The SD card slot 17 is used to read a program stored in an SD card 80. Said differently, not only the programs stored in the ROM 113 but also the programs stored in the SD card 80 may be loaded into the RAM 112 and executed by the image forming apparatus 10. The SD card 80 may be substituted by another recording medium such as a CD-ROM and a universal serial bus (USB)

memory. The kind of the recording medium corresponding to the position of the SD card 80 may not be limited to a predetermined type. In this case, the SD card slot 17 may be replaced by hardware depending on kinds of the recording media.

Figure 3:
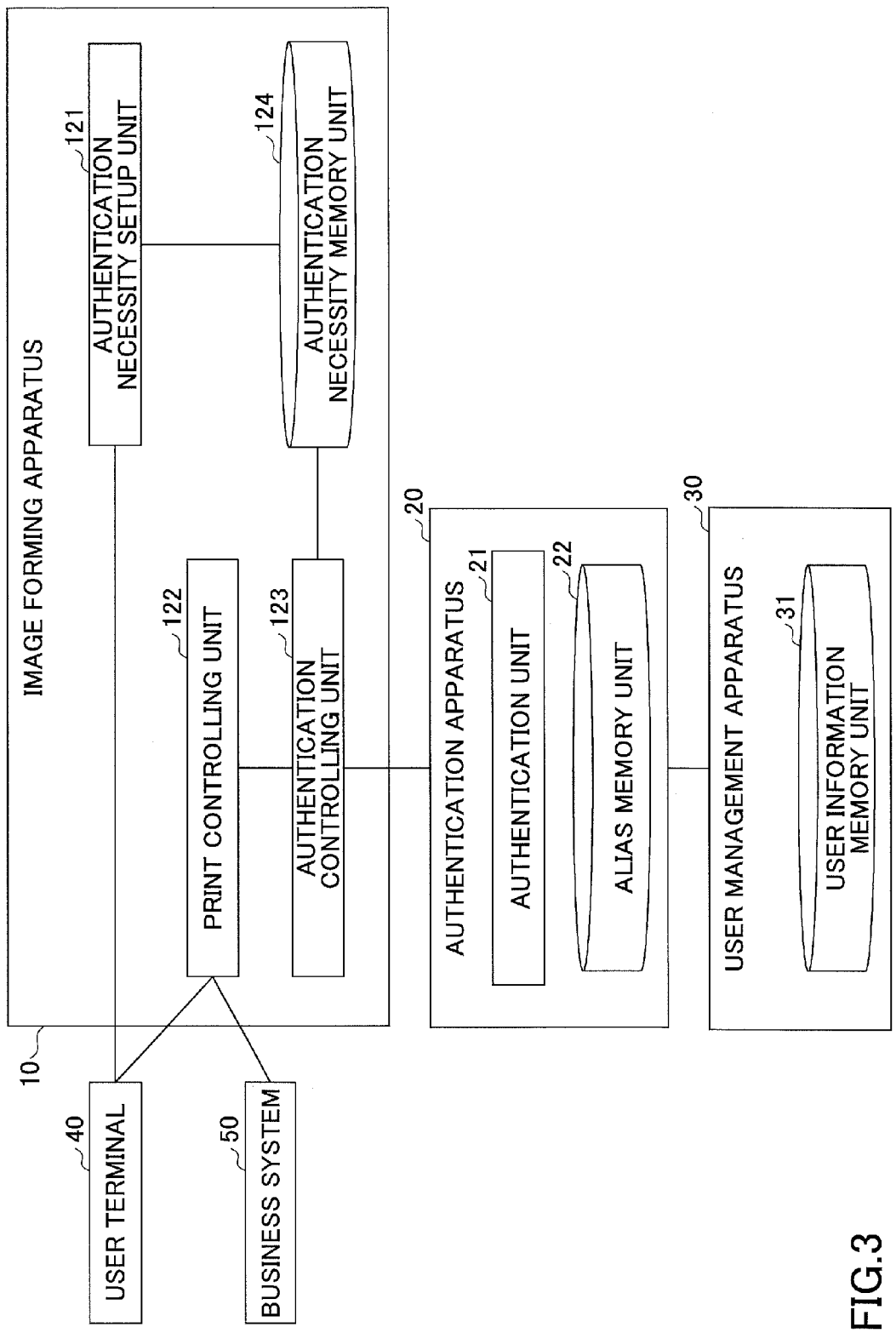
FIG. 3 illustrates an exemplary functional structure of a print system according to the embodiment of the present invention.

FIG. 3 illustrates an exemplary functional structure of the print system of the embodiment of the present invention. Referring to FIG. 3, the image forming apparatus 10 includes an authentication necessity setup unit 121, a print controlling unit 122, an authentication controlling unit 123, and so on. These units are substantialized when the program installed in the image forming apparatus 10 is executed by the CPU 111. The image forming apparatus 10 further includes an authentication necessity memory unit 124. The authentication necessity memory unit 124 may be substantialized by, for example, the HDD 114.

The authentication necessity setup unit 121 performs a process of causing a user such as the administrator to set information indicative of necessity of the authentication for each candidate of the transmission source of the print request sent to the image forming apparatus 10. For example, the authentication necessity setup unit 121 provides an authentication necessity setup screen to the user terminal 40. The user terminal 40 displays an authentication necessity setup screen and receives a setup from the user.

Figure 4:
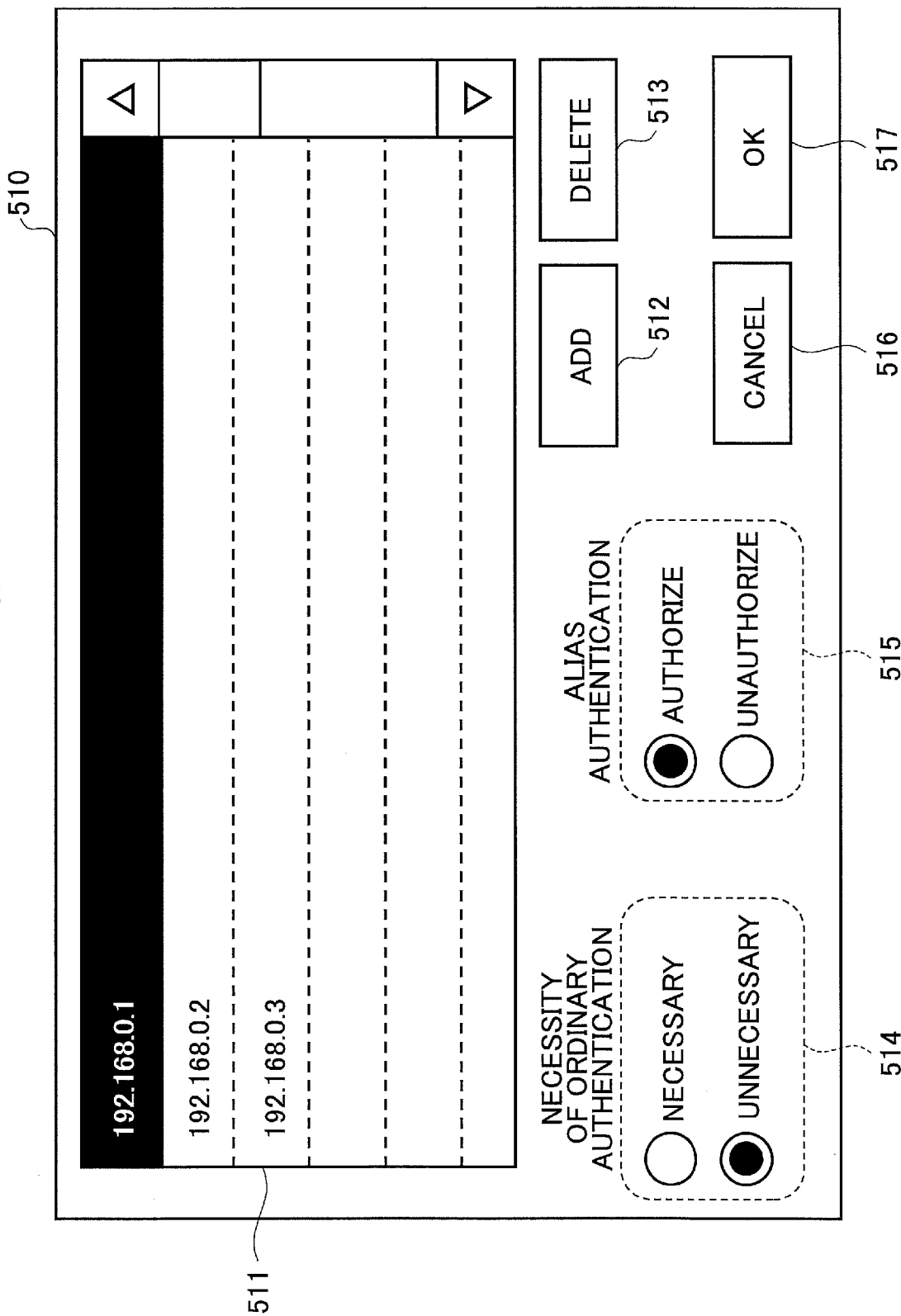
FIG. 4 is an exemplary display of an authentication necessity setup screen.

FIG. 4 is an exemplary display of the authentication necessity setup screen. Referring to FIG. 4, the authentication necessity setup screen 510 includes a candidate list 511, an addition button 512, a deletion button 513, a radio button 514, a radio button 515, a cancellation button 516, an OK button 517, and so on.

The candidate list 511 is a list of identification information of candidates for the transmission source of the print request to be sent to the image forming apparatus 10. Within the embodiment, the IP address is used as the identification information. However, the identification information may be other identification information such as a host name or a MAC address as long as the other identification information is designated in the print request and the transmission source of the print request can be identified by the other identification information. IP addresses of the business systems 50 are designated in the candidate list 511. However, the IP address of the user terminal 40 may be designated in the candidate list 511.

The addition button 512 is provided to receive a request for adding an entry to the candidate list 511. The deletion button 513 is provided to receive a deletion request of deleting an entry selected in the candidate list. The radio button 514 is provided to set the necessity of the ordinary authentication to candidates selected in the candidate list 511. The radio button 515 is provided to set authorization (or permission or ban) of the alias authentication for the candidate selected in the candidate list 511. The cancellation button 516 is provided to receive request for clearing setup content. In a case where the cancellation button 516 is pushed, the setup content is not stored in the authentication necessity memory unit 124. The OK button 517 is provided to receive a storage request of storing the setup content. When the OK button 517 is pushed, the authentication necessity setup unit 121 stores the setup content in the authentication necessity memory unit 124. The authentication necessity setup screen 510 may be displayed on the operation panel 15 of the image forming apparatus 10.

FIG. 5 illustrates a structural example of the authentication necessity memory unit 124. As illustrated in FIG. 5, the authentication necessity memory unit 124 stores the IP address, the necessity of the ordinary authentication, the authorization of alias authentication, and so on for each candidate for the transmission source of the print request.

Referring back to FIG. 3, the print controlling unit 122 receives the print request from the user terminal 40 or the business system 50. The print controlling unit 122 inquires of the authentication controlling unit 123 about whether the print is authorized in response to the received print request. The print controlling unit 122 performs the print for the print request for which the print is authorized.

The authentication controlling unit 123 determines whether the print in response to the print request which is inquired by the print controlling unit 122 is authorized based on information stored in the authentication necessity memory unit 122, a result of the authentication process using the user management apparatus 30, or the like.

The authentication apparatus 20 includes the authentication unit 21, an alias memory unit 22, or the like. The authentication unit 21 is substantialized by a CPU of the authentication apparatus 20 when a process of a program installed in the authentication apparatus 20 is performed by the CPU. The alias memory unit 22 is substantialized by an auxiliary memory device or the like included in the authentication apparatus 20. The authentication unit 21 performs the ordinary authentication or the alias authentication in response to the authentication request from the authentication controlling unit 123 of the image forming apparatus 10. The alias memory unit 22 stores each alias so that each alias corresponds to the user information stored in the user management apparatus 30.

FIG. 6 illustrates a structural example of the alias memory unit. Referring to FIG. 6, the alias memory unit 22 stores the alias, the IP address, the user name, the password, and so on for each alias.

The IP address is the identification information of the business system 50 whose alias is effective. Between the business systems 50, the user names may overlap because the user names are set mutually without relation. In order to enable the user names to be distinguishable for each business system 50, the identification information of the business system is associated with the alias. Other than the IP address may be used as the identification information of the business system 50. The user name and the password are configured to form the user information managed by the user management apparatus 30.

Referring back to FIG. 3, the user management apparatus 30 includes the user information memory unit 31. The user information memory unit 31 stores user information for each user.

Figure 7:
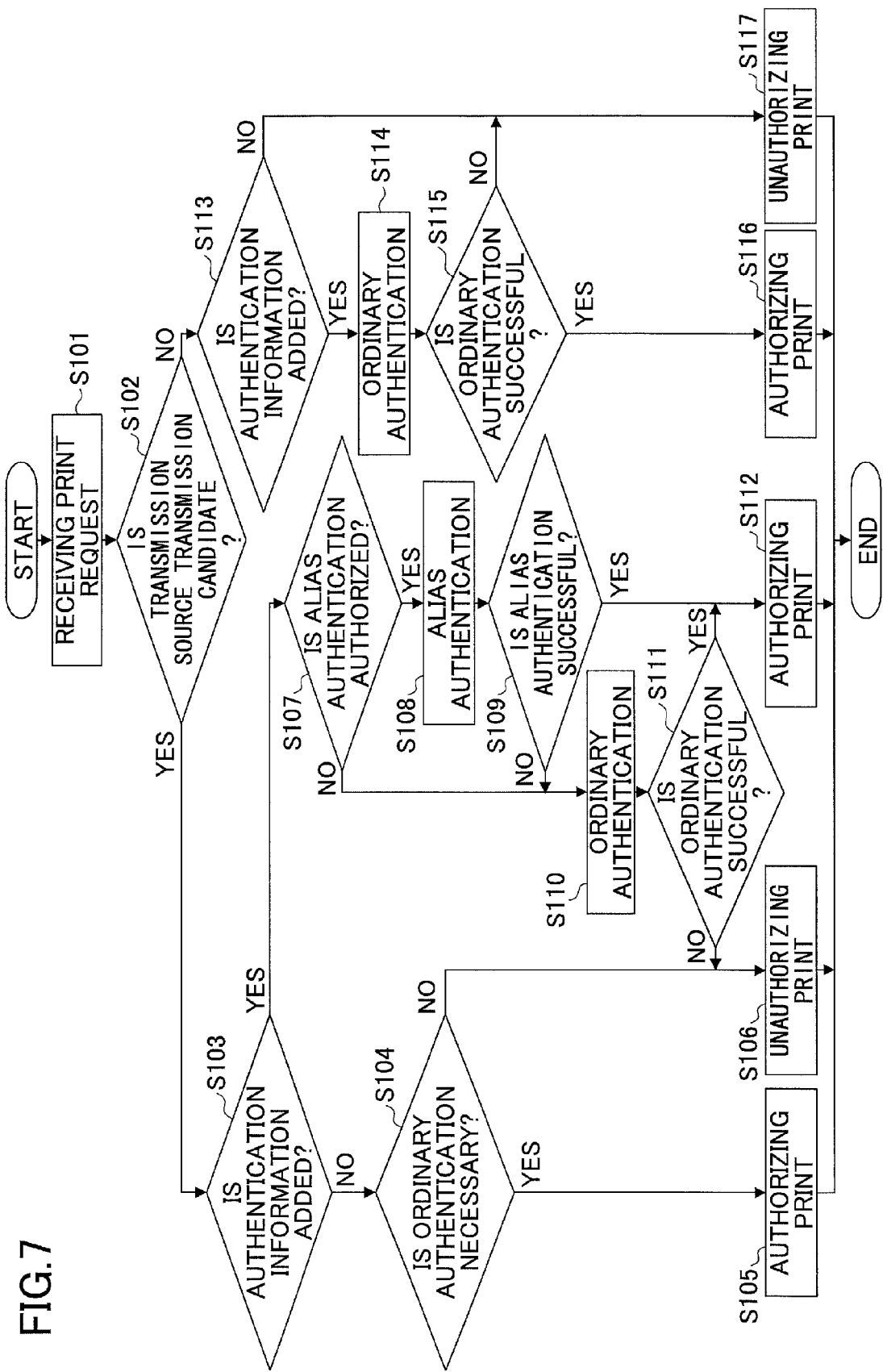
FIG. 7 is a flowchart illustrating an exemplary procedure performed by the image forming apparatus.

Hereinafter, the procedure of processes performed by the image forming apparatus 10 is described. FIG. 7 is a flowchart illustrating an exemplary procedure performed by the image forming apparatus.

In step S101, the print controlling unit 122 receives the print request from any one of the user terminals 40 or any one of the business systems 50. The print request includes data to be printed (the print data). The print controlling unit 122 inquires of the authentication controlling unit 123 about whether the print is authorized in response to the print request.

Subsequently, the authentication controlling unit 123 determines whether the transmission source (hereinafter, an "objective request transmission source") of the received print request is stored as the candidate of the transmission source in the authentication necessity memory unit 124 in step S102. For example, it is determined whether the address of the transmission source of a packet that sends the print request is stored in any one of records in the authentication necessity memory unit 124.

In a case where the objective request transmission source is stored as the candidate of the transmission source in the authentication necessity memory unit 124 (YES of S102), the authentication controlling unit 123 determines whether the authentication information is added to the print request. For example, it is determined whether the user name or the user name and the password are included in a predetermined item of the print data. In a case where the authentication information is not added (NO of S103), the authentication controlling unit 123 determines whether the ordinary authentication is unnecessary for the objective request transmission source (S104). This determination can be performed based on whether the information that the ordinary authentication is unnecessary for the objective request transmission source is stored in the authentication necessity memory unit 124.

In a case where it is determined that the ordinary authentication is unnecessary (NO of S104), the authentication controlling unit 123 sends a response indicating that the print is authorized to the print controlling unit 122 (S105). In a case where it is determined that the ordinary authentication is necessary (NO of S104), the authentication controlling unit 123 sends a response indicating that the print is unauthorized to the print controlling unit 122 (S106).

In a case where the authentication information is added (YES of S103), the authentication controlling unit 123 determines whether the alias authentication for the objective request transmission source is authorized (S107). This determination can be performed based on whether the information that the alias authentication is permitted for the objective request transmission source is stored in the authentication necessity memory unit 124.

In a case where it is determined that the alias authentication for the objective request transmission source is authorized (YES of S107), the authentication controlling unit 123 sends an execution request for performing the alias authentication while designating the user name included in the authentication information added to the print request (S108). The authentication unit 21 of the authentication apparatus 20 performs the authentication by treating the user name designated in the execution request for the alias authentication in response to the execution request. Specifically, the authentication unit 21 searches the alias memory unit 22 for the user name and the password corresponding to the alias. In a case where the corresponding user name and the corresponding password are not successfully searched, the authentication unit 21 determines that the alias authentication is failed. In a case where the corresponding user name and the corresponding password are successfully searched, the authentication unit 21 searches the user information memory unit 31 for the user information including the user name and the password. In a case where this user information is successfully searched, the authentication unit 21 determines that the alias authentication is successful. In a case where this user information is not successfully searched, the authentication unit 21 determines that the alias authentication is failed. The authentication unit 21 returns a result of the alias authentication to the authentication controlling unit 123.

In a case where the result of the alias authentication is failed (NO of S109), the authentication controlling unit 123 sends an execution request for performing the ordinary authentication while designating the user name and the password included in the authentication information added to the print request (S110). The authentication unit 21 of the authentication apparatus 20 searches the user information memory unit 31 for the user information including the user name and the password both designated in the execution request of the ordinary authentication in response to the execution request. In a case where this user information is successfully searched, the authentication unit 21 determines that the ordinary authentication is successful. In a case where this user information is not successfully searched, the authentication unit 21 determines that the ordinary authentication is failed. The authentication unit 21 returns a result of the ordinary authentication to the authentication controlling unit 123.

The reason why the ordinary authentication is performed in a case where the alias authentication is failed is that it is not distinguished whether the authentication information added to the print data is for the alias or not in the embodiment. Accordingly, the authentication information is firstly treated as the alias, and the authentication information is treated as the user name or the like for the ordinary authentication in a case where the alias authentication is failed. In a case where the alias is distinguished from the ordinary user name depending on a mode of adding to the print data, the print may be immediately unauthorized when the alias authentication is failed.

In a case where the result of the ordinary authentication is failed (NO of S111), the authentication controlling unit 123 sends a response indicating that the print is unauthorized (not permitted) to the print controlling unit 122 (S106). In a case where it is determined that the result of the ordinary authentication is successful (YES of S111), the authentication controlling unit 123 sends a response indicating that the print is authorized to the print controlling unit 122 (S112).

In a case where the objective request transmission source is not stored as the candidate of the transmission source in the authentication necessity memory unit 124 (NO of S102), the authentication controlling unit 123 determines whether the authentication information is added to the print request (S113). In a case where the authentication information is added (YES of S113), the authentication controlling unit 123 sends the execution request of the ordinary request to the authentication apparatus 20 while designating the user name and the password included in the authentication information (S114). The process performed by the authentication unit 21 of the authentication apparatus 20 in response to the execution request is as described in step S110.

In a case where it is determined that the result of the ordinary authentication is successful (YES of S115), the authentication controlling unit 123 sends a response indicating that the print is authorized to the print controlling unit 122 (S116). In a case where the result of the ordinary authentication is failed (NO of S115), the authentication controlling unit 123 sends a response indicating that the print is unauthorized (not permitted) to the print controlling unit 122 (S117).

The print controlling unit 122 performs the print in response to the print request in a case where the response indicating that the print is authorized is returned. In a case where the response indicating that the print is unauthorized, the print corresponding to the print request is not performed.

Subsequently, examples are given to the procedure illustrated in FIG. 7. As the first case, described is a receipt of the print request, to which the authentication information is not added in step S101 and of which IP address of the transmission source is "192.168.0.3". In the first case, the print controlling unit 122 inquires of the authentication controlling unit 123 about whether the print is authorized while designating the IP address of the transmission source of the received print request.

The authentication controlling unit 123 refers to the authentication necessity memory unit 124 (FIG. 5) and determines that "192.168.0.3" is registered as the candidate of the transmission source (YES of S102). Subsequently, the authentication controlling unit 123 determines that the authentication information is added to the print request based on the inquiry from the print controlling unit 122 without designation of the authentication information (NO of S103). Subsequently, the authentication controlling unit 123 refers to the authentication necessity memory unit 124 (FIG. 5) and determines that "192.168.0.3" does not require the ordinary authentication (YES of S104). Then, the authentication controlling unit 123 returns the response indicating that the print is authorized to the print controlling unit 122 (S105).

In a case where the ordinary authentication is necessary for "192.168.0.3" (NO of S104), the authentication controlling unit 123 sends a response indicating that the print is unauthorized to the print controlling unit 122.

As the second case, described is a receipt of the print request, to which the authentication information as an alias "hostsystem1" is added in step S101 and of which IP address of the transmission source is "192.168.0.1". In the second case, the print controlling unit 122 inquires of the authentication controlling unit 123 about whether the print is authorized while designating the IP address of the transmission source of the received print request and the authentication information.

The authentication controlling unit 123 refers to the authentication necessity memory unit 124 (FIG. 5) and determines that "192.168.0.1" is registered as the candidate of the transmission source (YES of S102). Subsequently, the authentication controlling unit 123 determines that the authentication information is added to the print request based on the inquiry from the print controlling unit 122 with designation of the authentication information (YES of S103). Subsequently, the authentication controlling unit 123 refers to the authentication necessity memory unit 124 (FIG. 5) and determines that the alias authentication is authorized for "192.168.0.1" (YES of S107). Subsequently, the authentication controlling unit 123 sends the execution request of the alias authentication to the authentication apparatus 20 while designating "hostsystem1" (S108).

In a case where the alias authentication is successful (YES of S109), the authentication controlling unit 123 sends a response indicating that the print is authorized to the print controlling unit 122 (S112). In a case where the alias authentication is failed (NO of S109), the authentication controlling unit 123 designates "hostsystem1" and requests the authentication apparatus 20 to perform the ordinary authentication (S110). In the ordinary authentication without using a password, it is possible to determine that the ordinary authentication is successful if the designated user name is stored in the user information memory unit 31.

In a case where the ordinary authentication is failed (NO of S111), the authentication controlling unit 123 sends a response indicating that the print is unauthorized to the print controlling unit 122 (S106). In a case where the ordinary authentication is successful (YES of S111), the authentication controlling unit 123 sends a response indicating that the print is authorized to the print controlling unit 122 (S112).

As the third case, described is a receipt of the print request, to which the authentication information as a user name "user1" is added in step S101 and of which IP address of the transmission source is "192.168.1.1". In the third case, the print controlling unit 122 inquires of the authentication controlling unit 123 about whether the print is authorized while designating the IP address of the transmission source of the received print request and the authentication information.

The authentication controlling unit 123 refers to the authentication necessity memory unit 124 (FIG. 5) and determines that "192.168.1.1" is not registered as the candidate of the transmission source (NO of S102). Subsequently, the authentication controlling unit 123 determines that the authentication information is added to the print request based on the inquiry from the print controlling unit 122 with designation of the authentication information (YES of S113).

Subsequently, the authentication controlling unit 123 sends the execution request of the ordinary authentication to the authentication apparatus 20 while designating the user name and the password both included on the authentication information (S114). In a case where the ordinary authentication is successful (YES of S115), the authentication controlling unit 123 sends a response indicating that the print is authorized to the print controlling unit 122 (S116). In a case where the ordinary authentication is failed (NO of S115), the authentication controlling unit 123 sends a response indicating that the print is unauthorized to the print controlling unit 122 (S117).

As described, within the embodiment, the necessity of the authentication, the type of the authentication, or the like can be changed in response to the transmission source of the print request. Therefore, flexibility of the authentication process for the print request can be improved. As a result, it is possible to reduce the necessity of installing the image forming apparatus 10 for each transmission source of the print request.

Within the embodiment, the print request is the example of the output request, and the print is the example of the output. However, the embodiment may be applied to the output mode other than the print. For example, a data distribution, a display of data, or the like may be the example of the output mode. In this case, the image forming apparatus 10 may not be a multifunction peripheral or a printer. For example, the image forming apparatus 10 may be replaced by a computer performing a delivery process, an apparatus for displaying data such as a projector, or the like.

Within the embodiment, the function of the image forming apparatus 10 may be provided to the authentication apparatus 20. Further, the authentication apparatus 20 and the user management apparatus 30 may be substantialized by one computer. Further, the image forming apparatus 10 may include functions of the authentication apparatus 20 and the user management apparatus 30. Within the embodiment, the function of the print system 1 may be aggregated into one information processing or distributed to multiple information processing apparatuses.

Within the embodiment, the image forming apparatus 10 or the print system 1 is an example of an information processing system or an information processing apparatus. The authentication necessity memory unit 124 is an example of a first memory unit. The print controlling unit 122 is an example of a receipt unit. The authentication controlling unit 123 is an example of a control unit. The user information memory unit 31 is an example of a second memory unit. The alias memory unit 22 is an example of a third memory unit. The user information stored in the user information memory unit 31 is an example of first user information. The alias is an example of second user information.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

Within the embodiment, flexibility of the authentication process for the print request can be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

This application is based upon and claims the benefit of priority of the prior Japanese Patent Application No. 2013-203213, filed on Sep. 30, 2013, the entire contents of which are incorporated herein by reference.

What is claimed is:

1. An information processing system including at least one information processing apparatus, the information processing system comprising:
   a first memory unit that stores
      information indicative of a necessity of an authentication to a print request using first user information stored in a second memory unit with respect to each candidate of a transmission source of the print request, and
      information indicative of an authorization of the authentication using second user information stored in a third memory unit and corresponding to the first user information;
   a receipt unit that receives the print request through a network; and
   a control unit that
      authorizes a print for the received print request, of which authentication information is received, in a case where the authentication is successful based on the authentication information,
      authorizes the print for the received print request, of which authentication information is not received, in a case where the authentication is determined by the transmission source of the print request to be unnecessary based on the information stored by the first memory unit,
      authorizes the print for the received print request, of which authentication information is received, in a case where it is determined that the authentication using the second user information based on the information stored by the first memory unit and when the authentication based on the first user information that corresponds to the second user information that matches the authentication information in the third memory unit is successful, and
      authorizes the print for the received print request, of which authentication information is received, in a case where it is determined that the authentication using the second user information based on the information stored by the first memory unit is unauthorized and when the authentication based on the authentication information and the first user information stored by the second memory unit is successful.

2. The information processing system according to claim 1, wherein the control unit authorizes the print for the received print request, of which authentication information is received, in the case where the authentication is successful based on the authentication information even in the case where the authentication is determined by the transmission source of the print request to be unnecessary based on the information stored by the first memory unit.

3. The information processing system according to claim 1, wherein the control unit authorizes the print for the received print request received from the transmission source, of which information indicating the necessity of the authentication is not stored in the first memory unit, in a case where the authentication is successful based on the authentication information received and corresponding to the print request.

4. An information processing apparatus comprising:
   a first memory unit that stores
      information indicative of a necessity of an authentication to a print request using first user information stored in a second memory unit with respect to each candidate of a transmission source of the print request, and
      information indicative of an authorization of the authentication using second user information stored in a third memory unit and corresponding to the first user information;
   a receipt unit that receives the print request through a network; and
   a control unit that
      authorizes a print for the received print request, of which authentication information is received, in a case where the authentication is successful based on the authentication information,
      authorizes the print for the received print request, of which authentication information is not received, in a case where the authentication is determined by the transmission source of the print request to be unnecessary based on the information stored by the first memory unit,
      authorizes the print for the received print request, of which authentication information is received, in a case where it is determined that the authentication using the second user information based on the information stored by the first memory unit and when the authentication based on the first user information that corresponds to the second user information that matches the authentication information in the third memory unit is successful, and
      authorizes the print for the received print request, of which authentication information is received, in a case where it is determined that the authentication using the second user information based on the information stored by the first memory unit is unauthorized and when the authentication based on the authentication information and the first user information stored by the second memory unit is successful.

5. The information processing apparatus according to claim 4, wherein the control unit authorizes the print for the received print request, of which authentication information is received, in the case where the authentication is successful based on the authentication information even in the case where the authentication is determined by the transmission source of the print request to be unnecessary based on the information stored by the first memory unit.

6. The information processing apparatus according to claim 4,
wherein the control unit authorizes the print for the received print request received from the transmission source, of which information indicating the necessity of the authentication is not stored in the first memory unit, in a case where the authentication is successful based on the authentication information received and corresponding to the print request.

7. A method of processing information in an information processing system including at least one information processing apparatus, the method comprising:
storing, by a first memory unit,
information indicative of a necessity of an authentication to a print request using first user information stored in a second memory unit with respect to each candidate of a transmission source of the print request, and
information indicative of an authorization of the authentication using second user information stored in a third memory unit and corresponding to the first user information;
receiving, by a receipt unit, the print request through a network; and
authorizing, by a control unit, a print for the received print request, of which authentication information is received, in a case where the authentication is successful based on the authentication information,
authorizing, by the control unit, the print for the received print request, of which authentication information is not received, in a case where the authentication is determined by the transmission source of the print request to be unnecessary based on the information stored by the first memory unit,
authorizing, by the control unit, the print for the received print request, of which authentication information is received, in a case where it is determined that the authentication using the second user information based on the information stored by the first memory unit and when the authentication based on the first user information that corresponds to the second user information that matches the authentication information in the third memory unit is successful, and
authorizing, by the control unit, the print for the received print request, of which authentication information is received, in a case where it is determined that the authentication using the second user information based on the information stored by the first memory unit is unauthorized and when the authentication based on the authentication information and the first user information stored by the second memory unit is successful.

8. The method according to claim 7,
wherein, in the authorizing by the control unit, the control unit authorizes the print for the received print request, of which authentication information is received, in the case where the authentication is successful based on the authentication information even in the case where the authentication is determined by the transmission source of the print request to be unnecessary based on the information stored by the first memory unit.

9. The method according to claim 7,
wherein, in the authorizing by the control unit, the control unit authorizes the print for the received print request received from the transmission source, of which information indicating the necessity of the authentication is not stored in the first memory unit, in a case where the authentication is successful based on the authentication information received and corresponding to the print request.

* * * * *